US006999308B2

(12) United States Patent
Hsu

(10) Patent No.: US 6,999,308 B2
(45) Date of Patent: Feb. 14, 2006

(54) MODULARIZED ELECTRONIC DEVICE ASSEMBLY ARCHITECTURE

(75) Inventor: Cheng-Chung Hsu, Taipei (TW)

(73) Assignee: Inventec Corporation, Taipei (TW)

( * ) Notice: Subject to any disclaimer, the term of this patent is extended or adjusted under 35 U.S.C. 154(b) by 170 days.

(21) Appl. No.: 10/757,421

(22) Filed: Jan. 15, 2004

(65) Prior Publication Data

US 2005/0157463 A1 Jul. 21, 2005

(51) Int. Cl.
*G05F 1/16* (2006.01)

(52) U.S. Cl. .................... 361/685; 248/27.1; 248/682; 720/657

(58) Field of Classification Search ............... 361/685; 248/27.1, 682; 720/657
See application file for complete search history.

(56) References Cited

U.S. PATENT DOCUMENTS

| | | | | |
|---|---|---|---|---|
| 5,077,722 A | * | 12/1991 | Geist et al. ................. | 720/657 |
| 5,481,431 A | * | 1/1996 | Siahpolo et al. ............ | 361/685 |
| 5,721,669 A | * | 2/1998 | Becker et al. .............. | 361/685 |
| 6,069,789 A | * | 5/2000 | Jung .......................... | 361/685 |
| 6,515,855 B1 | * | 2/2003 | Removedummy .......... | 361/685 |
| 6,606,256 B1 | * | 8/2003 | Lee et al. ................... | 361/825 |
| 6,625,014 B1 | * | 9/2003 | Tucker et al. .............. | 361/685 |
| 6,927,973 B2 | * | 8/2005 | Song et al. ................. | 361/685 |

* cited by examiner

*Primary Examiner*—Lisa Lea-Edmonds
(74) *Attorney, Agent, or Firm*—Birch, Stewart, Kolasch & Birch, LLP

(57) ABSTRACT

A modularized electronic device assembly architecture is proposed, which is designed for the assembly of a modularized electronic device to a base chassis effortlessly simply by hand without requiring the technical personnel or user to use any assisting tools; and which is characterized by the use of a specially designed hand-turnable reciprocating device that can be turned to generate either an inward linear force to mount the modularized electronic device in position on the base chassis, or an outward linear force to withdraw the modularized electronic device from the base chassis. This feature allows the manufacturer to assembly the modularized electronic device to the base chassis more quickly and efficiently and thereby significantly reduce the required labor hours and costs. Moreover, it also allows after-sale maintenance or upgrade to be carried out more quickly and efficiently.

7 Claims, 5 Drawing Sheets

MODULARIZED ELECTRONIC DEVICE ASSEMBLY ARCHITECTURE

BACKGROUND OF THE INVENTION

1. Field of the Invention

This invention relates to assembly technology for electronic and computer products, and more particularly, to a modularized electronic device assembly architecture, which is designed for the assembly of a modularized electronic device, such as a modularized hard disk drive, a modularized CD/DVD drive, and so on, onto a base chassis, such as a computer unit's base chassis, in such a manner that the mounting and dismounting of the modularized electronic device to and from the base chassis can be both carried out effortlessly simply by hand without requiring the technical personnel or user to use any assisting tools, such as screw drivers.

2. Description of Related Art

Modern assembly technologies for electronic and computer products is based on the concept of modularized design for all the functional units of an electronic or computer system, such that these modularized functional units can be easily assembled onto a circuit board to build a large electronic or computer system. In the manufacture of computers or servers, it is a common practice to design each hard drive as a single modularized device so that the modularized hard disk drive can be easily integrated to the computer.

Conventionally, a traditional way to integrate a modularized hard disk drive to a base chassis is to use screws or similar fastening means to fixedly secure the modularized hard disk drive onto the base chassis. One drawback to this practice, however, is that the technical personnel or user must use screw drivers or similar assisting tools to fasten the screws during the mounting process; and thereafter when it is needed to remove the modularized hard disk drive from the base chassis, it also requires the use of screw drivers to unfasten the screws to dismount the modularized device. This practice is undoubtedly quite laborious and time-consuming, which would increase labor hour in the assembly work and thus increase overall cost in the manufacture.

SUMMARY OF THE INVENTION

It is therefore an objective of this invention to provide a modularized electronic device assembly architecture which allows technical personnel or user to mount and dismount a modularized electronic device to and from a base chassis effortlessly simply by hand without requiring the use of any assisting tools.

It is another objective of this invention to provide a modularized electronic device assembly architecture which allows after-sale maintenance or upgrade of the modularized electronic device to be carried out more quickly and efficiently.

The modularized electronic device assembly architecture according to the invention is designed for the assembly of a modularized electronic device, such as a modularized hard disk drive, a modularized CD/DVD drive, and so on, onto a base chassis, such as a computer unit's base chassis, in such a manner that the mounting and dismounting of the modularized electronic device to and from the base chassis can be both carried out effortlessly simply by hand without requiring the technical personnel or user to use any assisting tools, such as screw drivers.

The modularized electronic device assembly architecture according to the invention is characterized by the use of a specially designed hand-turnable reciprocating device that can be turned to generate either an inward linear force to mount the modularized electronic device in position on the base chassis, or an outward linear force to withdraw the modularized electronic device from the base chassis. This feature allows the manufacturer to assembly the modularized electronic device to the base chassis more quickly and efficiently and thereby significantly reduce the required labor hours and costs. Moreover, it also allows after-sale maintenance or upgrade to be carried out more quickly and efficiently.

BRIEF DESCRIPTION OF DRAWINGS

The invention can be more fully understood by reading the following detailed description of the preferred embodiments, with reference made to the accompanying drawings, wherein.

DETAILED DESCRIPTION OF PREFERRED EMBODIMENTS

The modularized electronic device assembly architecture according to the invention is disclosed in full details by way of several preferred embodiments in the following with reference to the accompanying drawings.

Figure 1:
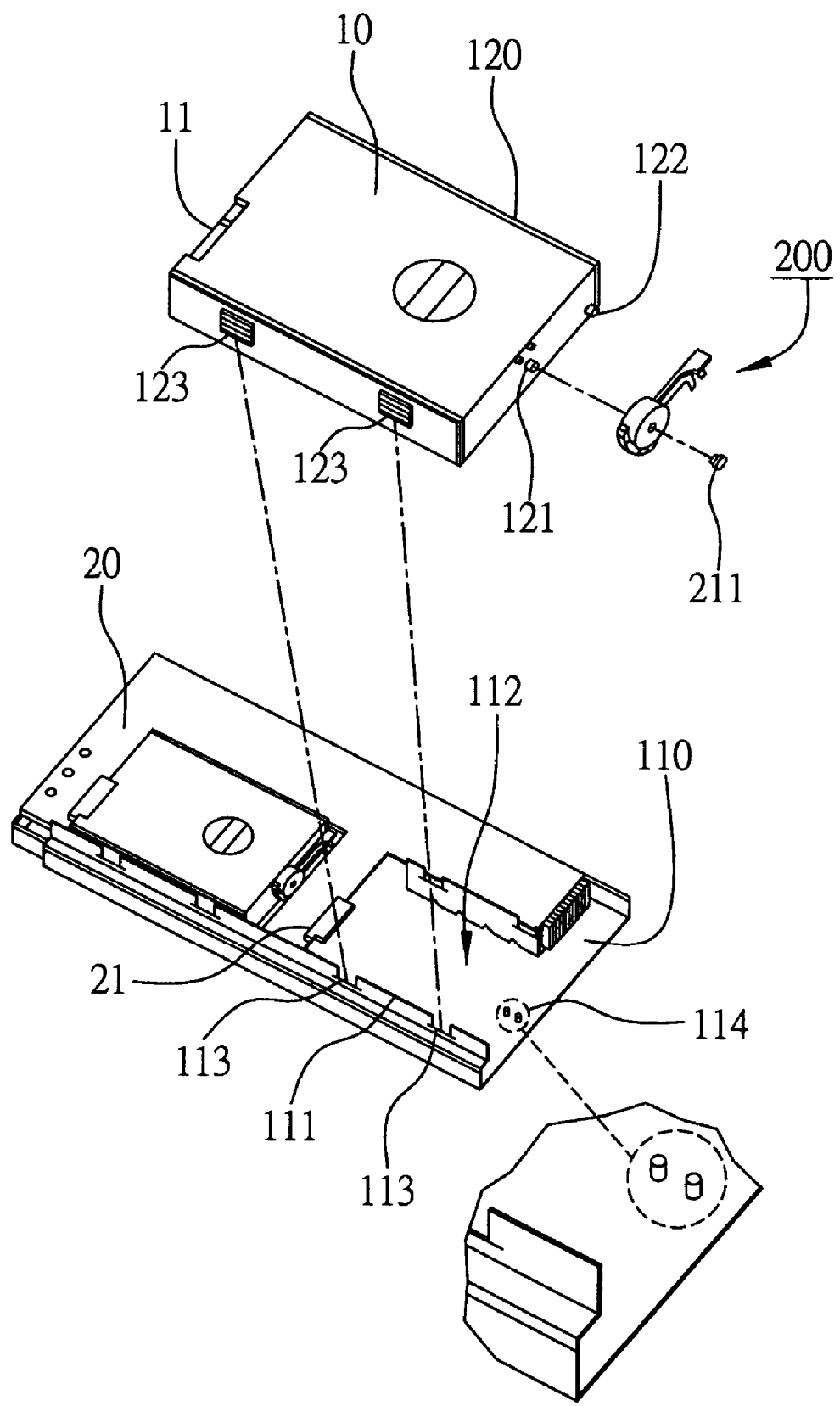
FIG. 1 shows an exploded perspective view of the modularized electronic device assembly architecture of the invention before being used for the assembly of a modularized electronic device onto a base chassis.

FIG. 1 shows an exploded perspective view of the modularized electronic device assembly architecture of the invention, which is designed for the assembly of a modularized electronic device 10, such as modularized hard disk drive, a modularized CD/DVD drive, and so on, onto a base chassis 20 and electrically connected to a connector 21 on the base chassis 20 in such a manner that the mounting of the modularized electronic device 10 to the base chassis 20 can be carried out effortlessly simply by hand without requiring the technical personnel or user to use any assisting tools, such as screw drivers; and thereafter, the technical personnel or user can dismount the modularized electronic device 10 from the base chassis 20 also effortlessly by hand without having to use any assisting tools.

The modularized electronic device assembly architecture of the invention comprises the following components: (a) a supportive base 110; (b) a bracket 120; and (c) a hand-turnable reciprocating device 200.

The supportive base 110 is provided on the base chassis 20, and which is provided with an engaging sidewall structure 111 extending from the connector 21 on the base chassis 20 to define a mounting area 112 on the supportive base 110. The engaging sidewall structure 111 is formed with a plurality of engaging openings 113. Beside, a guide structure 114 is provided on the mounting area 112 in opposition relative to the connector 21. In this preferred embodiment, for example, the guide structure 114 is implemented by a pair of pins separated from each other by a predefined width to provide a passage therebetween.

The bracket 120 is used to hold the modularized electronic device 10, and which is formed with a pivoting point 121 and a locking peg 122 on the front side thereof and is further formed with a plurality of tongues 123 on the two lateral sides thereof corresponding in size and position to the engaging openings 113 on the engaging sidewall structure 111 on the supportive base 110.

Figure 2A:
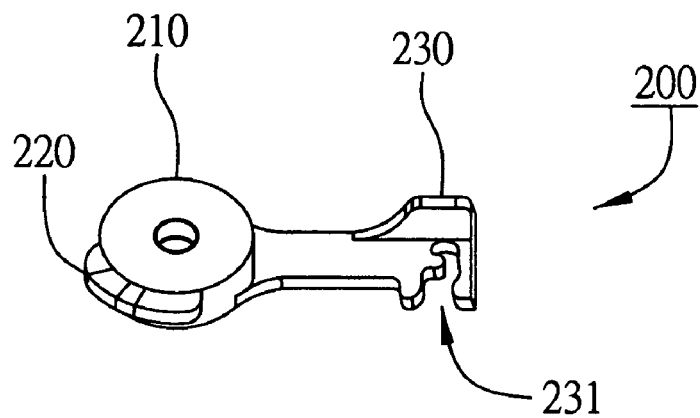
FIG. 2A shows a perspective view of a hand-turnable reciprocating device utilized by the modularized electronic device assembly architecture of the invention.
Figure 2B:
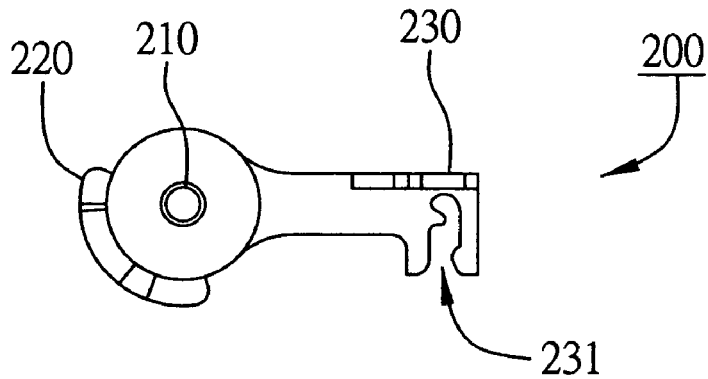
FIG. 2B shows the same of FIG. 2A in a lateral side view.
Figure 2C:
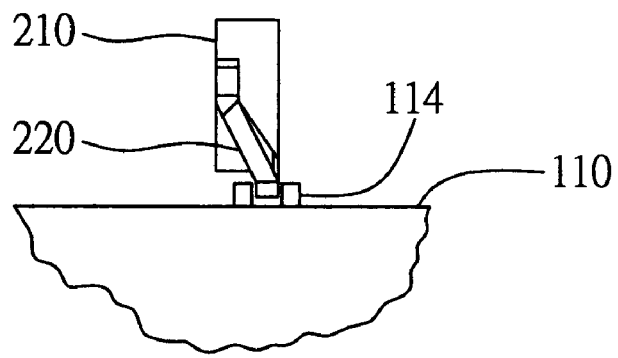
FIG. 2C shows a cross sectional view of the coupling of the hand-turnable reciprocating device shown in FIGS. 2A–2B to a guide structure on the supportive base.

Referring together to FIGS. 2A–2C, the hand-turnable reciprocating device 200 is integrally formed with a rotating portion 210, a spirally-extending rail portion 220, and a handle portion 230. The rotating portion 210 is substantially a flat cylindrical disk which can be pivotally fastened to the pivoting point 121 on the bracket 120 by means of a screw 211 (shown in FIG. 1) to allow the rotating portion 210 to be pivotally turnable about the pivoting point 121. The spirally-extending rail portion 220 is a rail structure which extends along the cylindrical surface of the rotating portion 210 and has a thickness that is matched to the width of the guiding passage in the guide structure 114, so that the spirally-extending rail portion 220 can be meshed to the guide structure 114 as illustrated in FIG. 2C. The handle portion 230 is an elongated bar structure having one end linked to the rotating portion 210 and the other end being a free end formed with a locking hole 231.

Figure 3A:
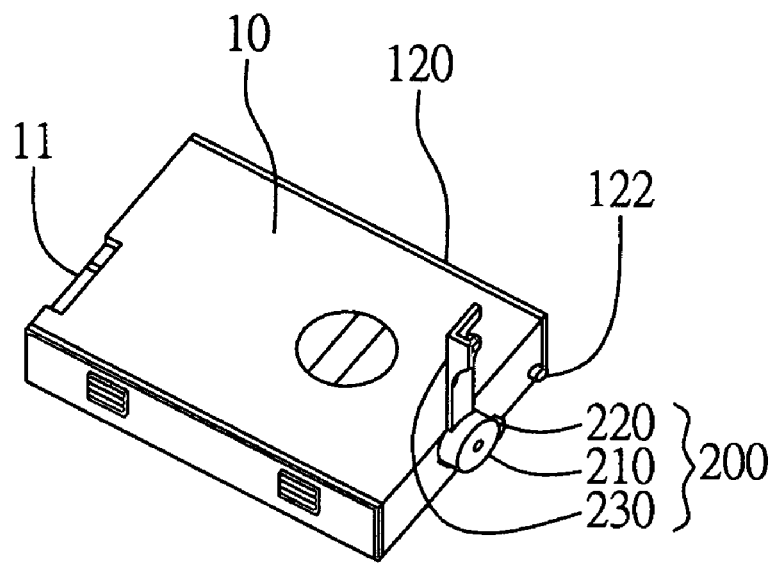
FIG. 3A shows a perspective view of the modularized electronic device with the coupled hand-turnable reciprocating device being turned to an upright unlocking position.
Figure 3B:
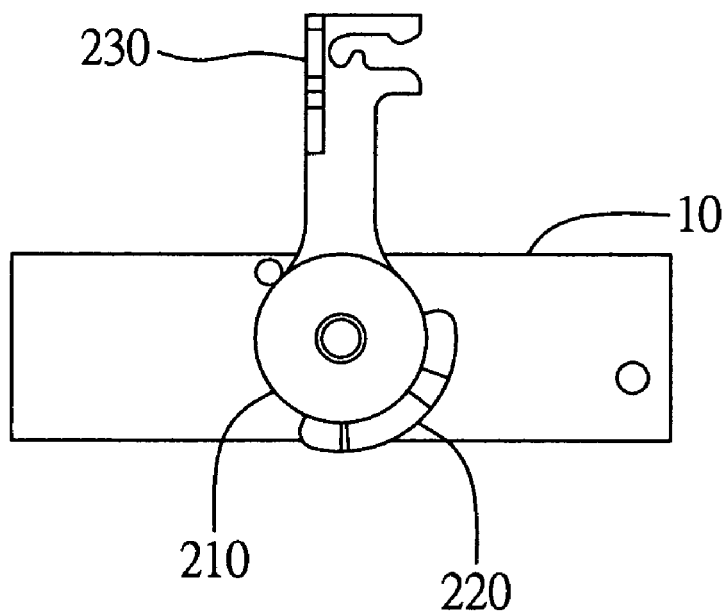
FIG. 3B shows the same of FIG. 3A in a lateral side view.

Referring together to FIGS. 3A–3B, during the assembly process, the first step is to securely attach the modularized electronic device 10 to the bracket 120, and then fasten the rotating portion 210 of the hand-turnable reciprocating device 200 to the pivoting point 121 on the bracket 120 by means of the screw 211 while setting the handle portion 230 in upright position relative to the body of the modularized electronic device 10.

Figure 4:
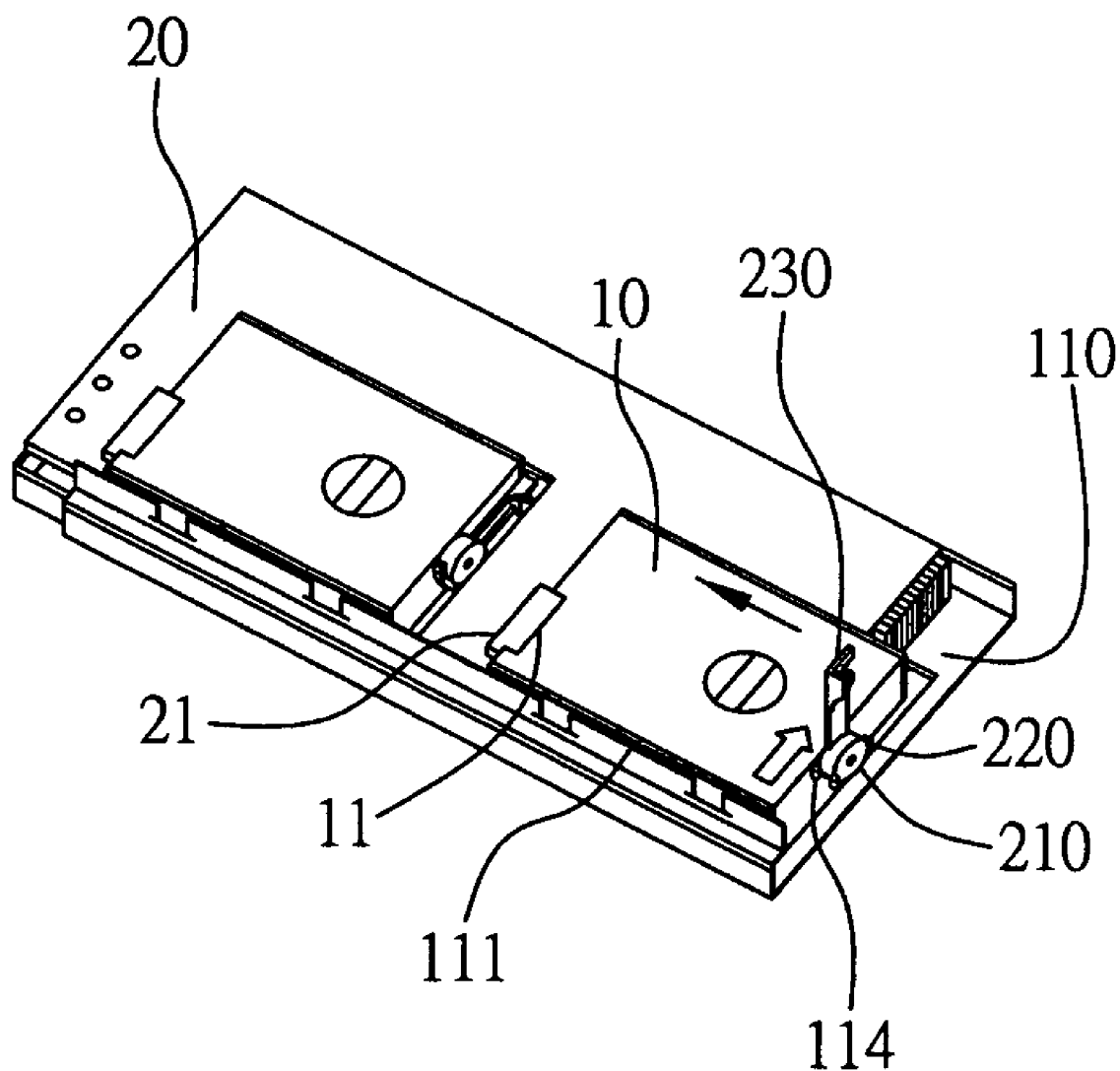
FIG. 4 shows a perspective view of the mounting of the modularized electronic device onto the base chassis.

Referring next to FIG. 4, in the subsequent step, the bracket 120 is engaged to the engaging sidewall structure 111 on the supportive base 110 by aligning and pressing down the tongues 123 on the bracket 120 respectively against the engaging openings 113 in the engaging sidewall structure 111. This allows the modularized electronic device 10 to be mounted on the mounting area 112 on the supportive base 110 and the spirally-extending rail portion 220 of the spirally-extending rail portion 220 to be meshed into the guiding passage of the guide structure 114.

Figure 5A:
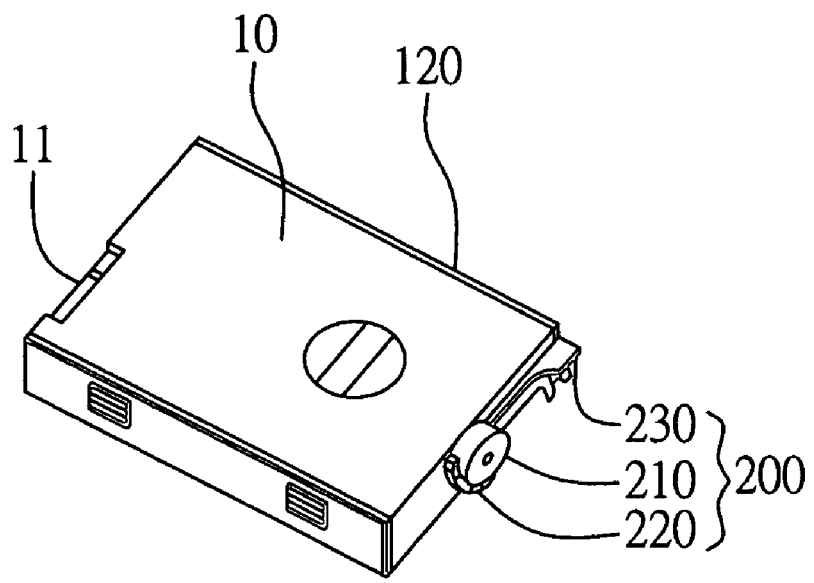
FIG. 5A shows a perspective view of the modularized electronic device with the coupled hand-turnable reciprocating device being turned to a leveled locking position.
Figure 5B:
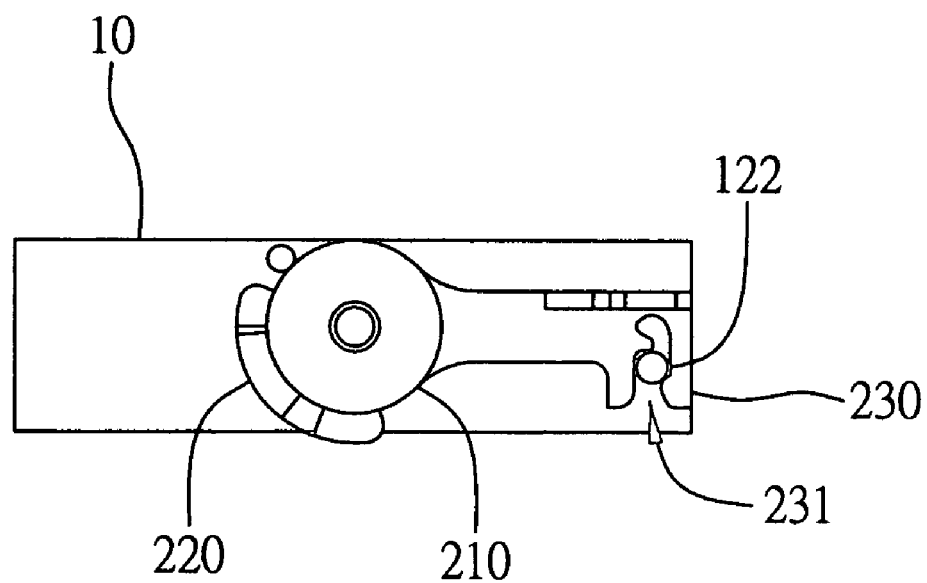
FIG. 5B shows the same of FIG. 5A in a lateral side view.

In the subsequent step, the technical personnel can then use hand to push against the uprightly-positioned handle portion 230 of the spirally-extending rail portion 220, which will then urge the rotating portion 210 to be turned in the clockwise direction (viewing from the illustration of FIG. 4), whereby the spirally-extending rail portion 220 on the hand-turnable reciprocating device 200 is urged to turn spirally and thereby generate an inward linear force against the bracket 120, thereby pushing the modularized electronic device 10 inwardly against the connector 21. As the locking hole 231 in the handle portion 230 is engaged with the locking peg 122 as illustrated in FIGS. 5A–5B, the modularized electronic device 10 is electrically connected to the connector 2 and also locked in position on the supportive base 110 by means of the tongues 123 being engaged to the engaging sidewall structure 111, which prevents the modularized electronic device 10 from being upwardly withdrawable from the base chassis 20. This completes the assembly of the modularized electronic device 10 onto the base chassis 20.

Thereafter, whenever it is needed to remove the modularized electronic device 10 from the base chassis 20, the technical personnel or user simply needs to use his/her hand to pull the handle portion 230 of the hand-turnable reciprocating device 200 so as to urge the rotating portion 210 to be turned in the counterclockwise direction (viewing from the illustration of FIG. 4), whereby the spirally-extending rail portion 220 on the hand-turnable reciprocating device 200 is urged to turn spirally and thereby generate an outward linear force that pulls the bracket 120 outwardly from the connector 21, thereby disconnecting the modularized electronic device 10 from the connector 21. As the tongues 123 on the bracket 120 are aligned to the engaging openings 113 in the engaging sidewall structure 111, the technical personnel or user can then use his/her hands to withdraw the modularized electronic device 10 from the base chassis 20. This completes the dismounting of the modularized electronic device 10 from the base chassis 20.

In conclusion, the invention provides a modularized electronic device assembly architecture, which is designed for the mounting and dismounting of a modularized electronic device to and from a base chassis effortlessly simply by hand without requiring the use of any assisting tools; and which is characterized by the use of a specially designed hand-turnable reciprocating device that can be turned to generate either an inward linear force to mount the modularized electronic device in position on the base chassis, or an outward linear force to withdraw the modularized electronic device from the base chassis. This feature allows the manufacturer to assembly the modularized electronic device to the base chassis more quickly and efficiently and thereby significantly reduce the required labor hours and costs. Moreover, it also allows after-sale maintenance or upgrade to be carried out more quickly and efficiently. The invention is therefore more advantageous to use than the prior art.

The invention has been described using exemplary preferred embodiments. However, it is to be understood that the scope of the invention is not limited to the disclosed embodiments. On the contrary, it is intended to cover various modifications and similar arrangements. The scope of the claims, therefore, should be accorded the broadest interpretation so as to encompass all such modifications and similar arrangements.

What is claimed is:

1. A modularized electronic device assembly architecture for the assembly of a modularized electronic device to a base chassis;

the modularized electronic device assembly architecture comprising:

a supportive base, which is provided on the base chassis, and which is defined with a mounting area and is provided with a guide structure at a predefined position;

a bracket, which is used to hold the modularized electronic device, and which is formed with a pivoting point on one side thereof;

a hand-turnable reciprocating device, which is formed with a rotating portion, a spirally-extending rail portion, and a handle portion; wherein the rotating portion is substantially a cylindrical disk having axis pivotally linked to the pivoting point on the bracket so as to be pivotally turnable about the pivoting point;

the spirally-extending rail portion is a rail structure which extends along the cylindrical surface of the rotating portion and is meshable to the guide structure; and the handle portion is an elongated bar structure having one end linked to the rotating portion and the other end being a free end;

and wherein when the rotating portion is urged by the handle portion to turn in a first angular direction, it causes the spirally-extending rail portion to generate a linear force in a first direction that pushes the bracket in the first direction and therefore the modularized electronic device in position on the supportive base on the base chassis; and whereas when the rotating portion is urged by the handle portion to turn in a second angular direction, it causes the spirally-extending rail portion to generate a linear force in a second direction that pulls the bracket in the second direction and thereby withdraw the modularized electronic device from the base chassis.

2. The modularized electronic device assembly architecture of claim 1, wherein the modularized electronic device is a modularized hard disk drive.

3. The modularized electronic device assembly architecture of claim 1, wherein the modularized electronic device is a modularized CD/DVD drive.

4. The modularized electronic device assembly architecture of claim 1, wherein the guide structure includes a pair of pins separated from each other by a predefined width that is matched to the thickness of the spirally-extending rail portion of the hand-turnable reciprocating device so as to allow the spirally-extending rail portion to be meshable to the passage between the two pins.

5. The modularized electronic device assembly architecture of claim 1, wherein the supportive base is provided with an engaging sidewall structure which defines the mounting area on the supportive base.

6. The modularized electronic device assembly architecture of claim 5, wherein the engaging sidewall structure is formed with a plurality of engaging openings, and correspondingly, the bracket is formed with a plurality of tongues on the sides thereof, for engaging the bracket to the supportive base by means of fitting the tongues against the engaging openings.

7. The modularized electronic device assembly architecture of claim 1, wherein the bracket is further formed with a locking peg beside the pivoting point, and correspondingly, the handle portion of the hand-turnable reciprocating device is formed with a locking hole in the free end thereof, for locking the handle portion in position when the modularized electronic device is mounted in position on the base chassis.

* * * * *